3,432,497
2-AMINO-5,6-DIHYDRO-4H-1,3,4-OXADIAZINES
Donald L. Trepanier, Indianapolis, Ind., assignor to The Dow Chemical Company, Midland, Mich., a corporation of Delaware
No Drawing. Filed Sept. 30, 1966, Ser. No. 583,452
U.S. Cl. 260—244                    5 Claims
Int. Cl. C07d 87/52

ABSTRACT OF THE DISCLOSURE

2 - amino-5,6-dihydro-4H-1,3,4-oxadiazine compounds are prepared by the reaction of a substituted hydrazino alcohol and cyanogen bromide at a temperature of from about 0°–40° C. The novel compounds have activity as sedatives, tranquilizers and analgesic agents.

---

This invention is concerned with novel amino oxadiazine compounds and their acid addition salts and with a method for their preparation. More particularly, this invention is directed to compounds corresponding to the formula:

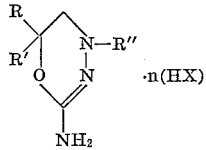

In the present specification and claims, R and R' each independently represent hydrogen, methyl or ethyl, R'' represents methyl or ethyl, X represents picrate, chloride or physiologically-acceptable dicarboxylate having from 2 to 4 carbon atoms, inclusive, and $n$ represents one of the integers zero and 1. The novel oxadiazines are clear colorless oils or white crystalline solids which are only slightly soluble in water and soluble in chlorinated hydrocarbons. Acid addition salts such as the hydrochlorides, oxalates, succinates and maleates are soluble in water, methanol, ethanol, dimethylformamide and dimethylsulfoxide.

The novel oxadiazines have been found to be useful as sedatives, analgesic agents and transquilizers and have been found to be particularly useful for administration to laboratory animals in studying the behavior thereof and in ascertaining drug effects on the central and peripheral nervous system.

The novel compounds are prepared by contacting cyanogen bromide and an alkali metal acetate with a substituted alkyl hydrazino alcohol corresponding to the formula:

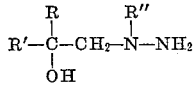

The reaction is preferably carried out with a polar organic solvent as reaction medium. The reaction proceeds at temperatures from about 0° to about 40° C. and is preferably carried out at temperatures from about 10° C. to about 30° C. In the formation of the novel oxadiazines, the exact amount of the reagents is not critical, provided that large excesses of cyanogen bromide are avoided. However, the use of substantially equimolar proportions of cyanogen bromide and alkyl hydrazino alcohol is desirable, a slight excess of cyanogen bromide being preferred. The use of about two moles of acetate for each mole of cyanogen bromide is also preferred.

In a convenient procedure, cyanogen bromide, in methanol solution, is added to a methanol solution of sodium acetate and an appropriate alkyl hydrazino alcohol. The addition is carried out at low temperatures (about 10°–15° C.) in a well-ventilated hood. The reaction mixture is stirred at about 25° C. until the reaction has gone to completion. The reaction medium can be removed by distillation or evaporation, for example, and the residue made strongly basic with cold aqueous alkali metal hydroxide. The oxadiazine product is separated by such conventional procedures as extraction, preferably with a chlorinated hydrocarbon solvent. The product may be further purified by conventional procedures such as distillation and recrystallization.

The acid addition salts of the novel oxadiazines are prepared by reacting the oxadiazine with a suitable acid in the presence of an inert organic solvent such as ethanol or ether.

The following examples illustrate the invention but are not to be construed as limiting the same.

EXAMPLE 1

1-(1-methylhydrazino)-t-butanol (106.35 grams; 0.9 mole) and sodium acetate (154 grams; 1.88 moles) were dissolved in 750 milliliters of methanol and cooled in an ice bath to about 15° C. To the stirred mixture cyanogen bromide (100 grams; 0.945 mole), dissolved in 250 milliliters of methanol, was added dropwise. After about 25 percent of the cyanogen bromide was added to the reaction mixture, the mixture was held overnight and the remainder of the cyanogen bromide was added over a period of about two hours. The reaction mixture was concentrated in vacuo and 100 milliliters of 10 N sodium hydroxide solution was added to bring the pH of the resulting mixture over 11. The mixture was extracted with five 100-milliliter portions of chloroform and the extract washed with 50 milliliters of water and 100 milliliters of brine. The combined chloroform extracts were dried over anhydrous magnesium sulfate and concentrated in vacuo to leave a reddish oily residue. The residue was distilled twice in vacuo and the product was collected as a fraction boiling at about 85° C. under a pressure of 0.8 millimeter of mercury. When a third distillation of this fraction was attempted, the prdouct crystallized in the receiver, and was recrystallized from a mixture of ether and hexane. The 2-amino-5,6-dihydro-4,6,6-trimethyl-4H-1,3,4-oxadiazine product was found to melt at 85°–86.5° C. The structure was confirmed by nuclear magnetic resonance analysis. The product was found, by analysis, to have carbon, hydrogen and nitrogen contents of 50.56, 9.18 and 29.60 percent, respectively, as compared with the theoretical contents of 50.33, 9.15 and 29.35 percent, respectively, calculated for said oxadiazine.

In substantially the same procedure, 2-amino-5,6-dihydro-4,6-diethyl-6-methyl-4H-1,3,4-oxadiazine, having a molecular weight of 171, is prepared by the addition of one molar proportion of cyanogen bromide to a mixture of one molar proportion of 1-(1-ethylhydrazino)-2-methyl-n-butan-2-ol and two molar proportions of sodium acetate.

In substantially the same procedure, 2-amino-5,6-dihydro-4,6,6-triethyl-4H-1,3,4-oxadiazine, having a molecular weight of 185, is prepared by adding one molar proportion of cyanogen bromide to a mixture of one molar proportion of 1-(1-ethylhydrazino)-2-ethyl-n-butan-2-ol and two molar proportions of potassium acetate.

EXAMPLE 2

1-(1-methylhydrazino)-2-propanol (10.4 grams; 0.10 mole) and sodium acetate (19 grams; 0.20 mole) were dissolved in 200 milliliters of methanol and cooled to about 10° C. To the stirred, cooled mixture was added dropwise a solution of cyanogen bromide (11.7 grams; 0.11 mole) in 150 milliliters of methanol. The mixture was stirred for 18 hours at a temperature of about 25° C. after which most of the methanol was distilled off in vacuo. The stirred residue was cooled in an ice bath and treated with cooled concentrated aqueous sodium hydroxide solution to bring the pH to about 12. During the addition of the sodium hydroxide, heat was evolved. The alkaline solution was extracted with methylene chloride, the methylene chloride extract was distilled at reduced pressure and the product was collected as a fraction boiling at 73°–80° C. under a pressure of 0.1 millimeter of mercury. The 2-amino-5,6-dihydro-4,6-dimethyl-4H-1,3,4-oxadiazine product was found by analysis to have carbon, hydrogen and nitrogen contents of 46.06, 8.74 and 30.69 percent, respectively, as compared with the theoretical contents of 46.44, 8.59 and 32.53 percent, respectively, calculated for the named structure.

EXAMPLE 3

In substantially the same procedure as in Example 2, 2 - amino-5,6 - dihydro-4,6-dimethyl-4H-1,3,4-oxadiazine was prepared by the addition of 0.82 mole of cyanogen bromide to a mixture of 0.80 mole of 1-(1-methylhydrazino)-2-propanol and 1.6 moles of sodium acetate. The oxadiazine product was collected as a fraction boiling at 92°–94° C. at a pressure of 2.0 millimeters of mercury. The structure of the oxadiazine product was confirmed by infrared spectroscopy and nuclear magnetic resonance analysis. The 2-amino-5,6-dihydro-4,6-dimethyl-4H-1,3,4-oxadiazine product was redistilled and collected at a temperature of 94°–96° C. under a pressure of 2 millimeters of mercury. The product was found by analysis to have carbon, hydrogen and nitrogen contents of 46.28, 8.63 and 32.70 percent, respectively, as compared with the theoretical contents of 46.49, 8.59 and 32.53 percent, respectively, calculated for the named structure.

In substantially the same procedure, 2-amino-5,6-dihydro-4,6-diethyl-4H-1,3,4-oxadiazine, having a molecular weight of 157, is prepared by adding one molar proportion of cyanogen bromide to a mixture of one molar proportion of 1-(1-ethylhydrazino)-n-butan-2-ol and two molar proportions of sodium acetate.

EXAMPLE 4

1-(1-methylhydrazino)-2-ethanol (81 grams; 0.90 mole) and sodium acetate (154 grams; 1.88 moles) were dissolved in 750 milliliters of methanol and the mixture cooled to 10° C. A solution of cyanogen bromide (100 grams; 0.94 mole) in 300 milliliters of methanol prepared by dissolving the cyanogen bromide in methanol in a well-ventilated hood was added dropwise to the cooled stirred mixture. The resulting mixture was stirred at about 25°–30° C. overnight, after which most of the methanol was removed by distillation in vacuo. The mixture was then cooled in an ice bath and made basic by the portionwise addition of an ice cooled solution of 60 grams of sodium hydroxide in 150 milliliters of water. The basic solution was thoroughly extracted with ether, the ether extract was dried over magnesium sulfate and the ether evaporated in vacuo. The residue was distilled in vacuo and the product collected as a fraction boiling at about 90° C. at a pressure of 0.3 millimeter of mercury. The 2-amino - 5,6-dihydro - 4 - methyl-4H - 1,3,4 - oxadiazine product crystallized in the receiving flask, but was too hygroscopic for an accurate determination of the melting point. The structure of the product was substantiated by infrared spectroscopy. The oxadiazine product was found by analysis to have carbon, hydrogen and nitrogen contents of 41.65, 8.62 and 36.88 percent, respectively, as compared with the theoretical contents of 41.73, 7.88 and 36.50 percent, respectively, calculated for the named structure.

EXAMPLE 5

The 2-amino - 5,6 - dihydro-4,6-dimethyl-4H-1,3,4-oxadiazine of Example 3 (1 gram) was contacted with picric acid (1 gram) dissolved in a minimal amount of ethanol. A precipitate formed instantly and was separated by filtration. The 2-amino-5,6-dihydro-4,6-dimethyl-4H-1,3,4-oxadiazine picrate product was recrystallized twice from ethanol and found to melt at 190°–192° C. with decomposition. The product was found by analysis to have carbon, hydrogen and nitrogen contents of 37.24, 4.28 and 24.05 percent, respectively, as compared with the theoretical contents of 36.88, 3.94 and 23.46 percent, respectively, calculated for the said picrate.

In substantially the same procedure, the following salts of the oxadiazine compound of Example 3 were prepared.

2-amino - 5,6-dihydro-4,6-dimethyl-4H-1,3,4-oxadiazine succinate was prepared by combining one gram of the 2-amino - 5,6-dihydro - 4,6-dimethyl-4H-1,3,4 - oxadiazine compound of Example 3 and one gram of succinic acid in ethanol solution, and adding ether to precipitate the oxadiazine succinate.

2 - amino-5,6-dihydro-4,6-dimethyl-4H-1,3,4-oxadiazine hydrochloride was prepared by mixing one gram of the above-described compound of Example 3 with an approximately equimolar amount of hydrogen chloride in ethanol. The oxadiazine hydrochloride product was too hygroscopic to permit an accurate determination of the melting point.

In substantially the same procedure, the following acid addition salts are prepared.

2-amino - 5,6-dihydro-4,6,6-trimethyl - 4H-1,3,4-oxadiazine oxalate, having a molecular weight of 232, is prepared by combining one molar proportion of 2-amino-5,6-dihydro-4,6,6-trimethyl-4H-1,3,4-oxadiazine with an equimolar proportion of oxalic acid.

2-amino-5,6-dihydro - 4-methyl - 4H-1,3,4-oxadiazine malate, having a molecular weight of 249, is prepared by mixing one molar proportion of 2-amino-5,6-dihydro-4-methyl-4H-1,3,4-oxadiazine with one molar proportion of malic acid.

Central nervous system activity of the oxadiazines was demonstrated by their effectiveness in prolonging hexobarbital sleep time in mice. In these determinations, the mice received dosages of one of the oxadiazines at a rate of 100 milligrams per kilogram one hour before intraperitoneal administration of hexobarbital at a dosage rate of 100 milligrams per kilogram. Untreated mice were similarly injected with hexobarbital at a dosage rate of 100 milligrams per kilogram to serve as checks. The hexobarbital injections induced sleep in the mice. All the animals were then placed on their backs and the period of time until each mouse spontaneously turned over and righted itself was recorded as the sleep time. The duration of sleep in the mice which had been pretreated with the 2-amino-4,5,6-trimethyl-1,3,4-oxadiazine compound was about 5.5 times as long as the sleep time for the check mice. The sleep time for the mice pretreated with the 4-methyl-oxadiazine compound was about 2 times, and that for the mice treated with the 4,6-dimethyl-oxadiazine compound about 3.8 times the sleep time for the check mice.

The 2-amino-4,6-dimethyl-1,3,4-oxadiazine compound was also found to be effective in protecting mice pretreated with the aforesaid compound against writhing induced by challenging with hydrochloric acid by intraperitoneal injection. The same oxadiazine compound was found to be effective in blocking tremors in mice pretreated with the 4,6-dimethyl-oxadiazine compound and subsequently administered, 1,4-dipyrrolidino-2-butyne by subcutaneous injection. Administration of 1,4-dipyrrolidino-2-butyne to check mice not previously treated with a protective drug uniformly induces marked tremors in such mice.

I claim:

1. A 2-amino-1,3,4-oxadiazine compound corresponding to the formula

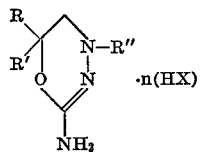

wherein R and R' each independently represent a member of the group consisting of hydrogen, methyl and ethyl, R" represents a member of the group consisting of methyl and ethyl, X represents a member of the group consisting of picrate, chloride and a physiologically-acceptable dicarboxylate of from 2 to 4 carbon atoms, inclusive, and n represents one of the integers zero and 1.

2. The oxadiazine compound claimed in claim 1 wherein the compound is 2-amino-5,6-dihydro-4-methyl-4H-1,3,4-oxadiazine.

3. The oxadiazine compound claimed in claim 1 wherein the compound is 2-amino-5,6-dihydro-4,6-dimethyl-4H-1,3,4-oxadiazine.

4. The oxadiazine compound claimed in claim 1 wherein the compound is 2-amino-5,6-dihydro-4,6,6-trimethyl-4H-1,3,4-oxadiazine.

5. The oxadiazine compound claimed in claim 1 wherein the compound is 2-amino-5,6-dihydro-4,6-dimethyl-4H-1,3,4-oxadiazine picrate.

References Cited

UNITED STATES PATENTS 3,115,494   12/1963   Meschino et al. ____ 260—244

OTHER REFERENCES

Dox: Jour. Amer. Chem. Soc., vol. 48, pp. 1951–4 (1926).

Meschino, et al.: Jour. Org. Chem., vol. 28, 3129–34 (1963).

Rosenblum et al.: Jour. Amer. Chem. Soc., vol. 85, pp. 3874–8 (1963).

Trepanier et al.: Jour. Org. Chem. vol. 29, pp. 668–72 (1964).

HENRY R. JILES, Primary Examiner.

N. TROUSOF, Assistant Examiner.

U.S. Cl. X.R

260—584, 999